May 20, 1924.
P. T. POTTS
SANITARY CUP MAKING MACHINE
Original Filed Jan. 17, 1921  13 Sheets-Sheet 11
1,495,039
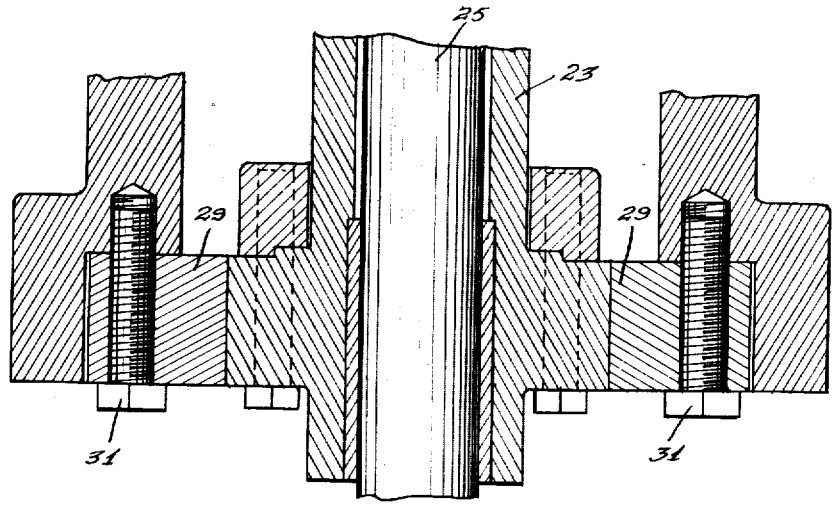
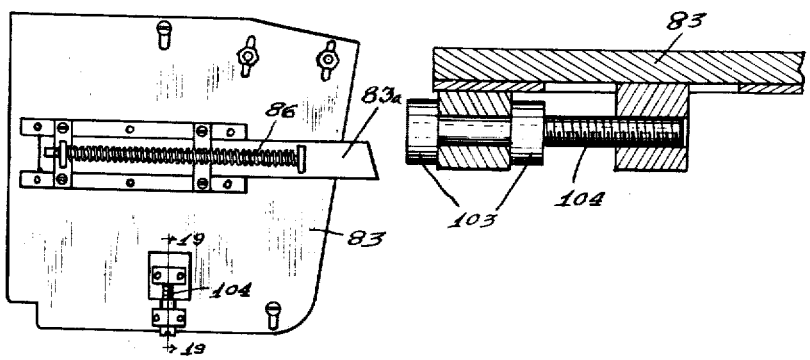

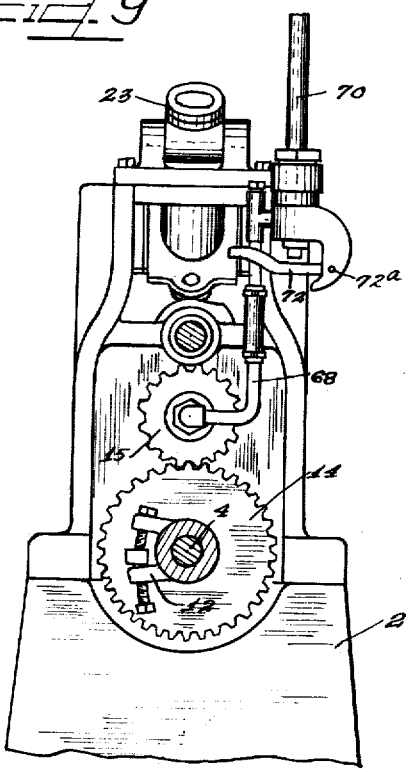
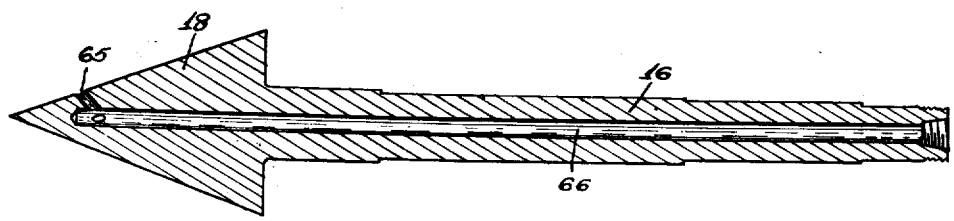

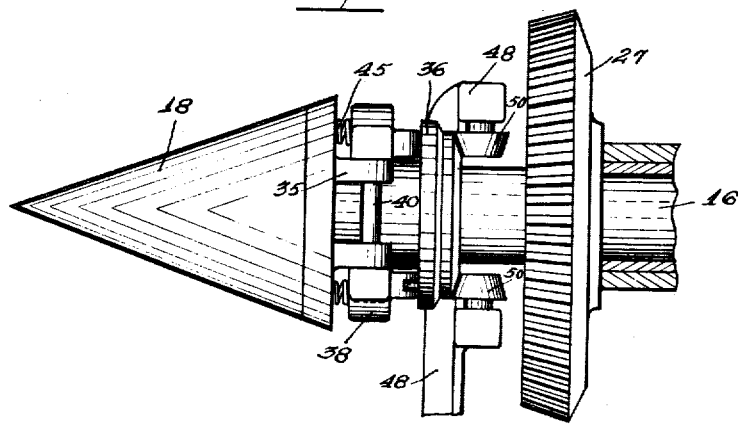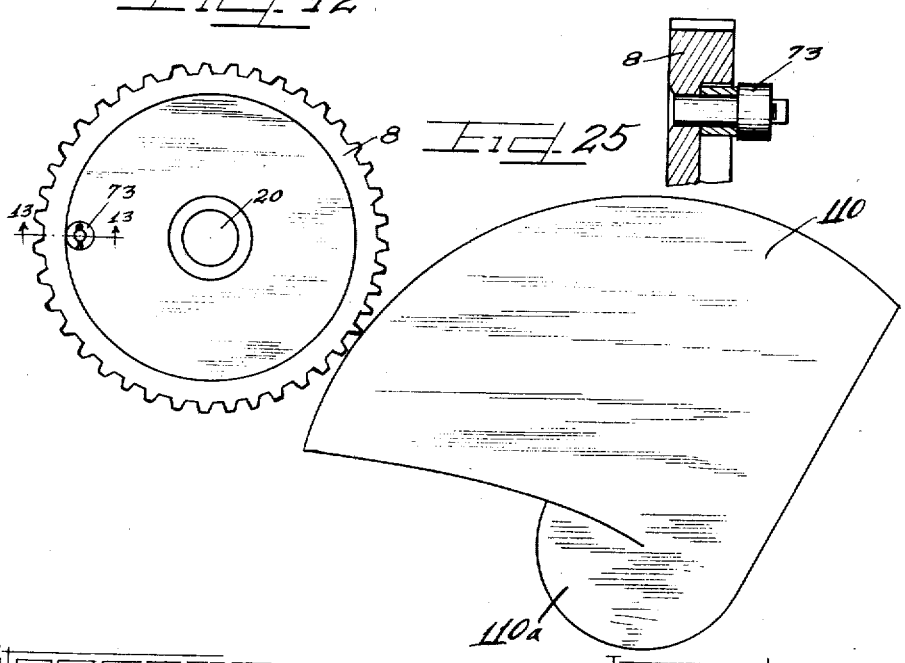

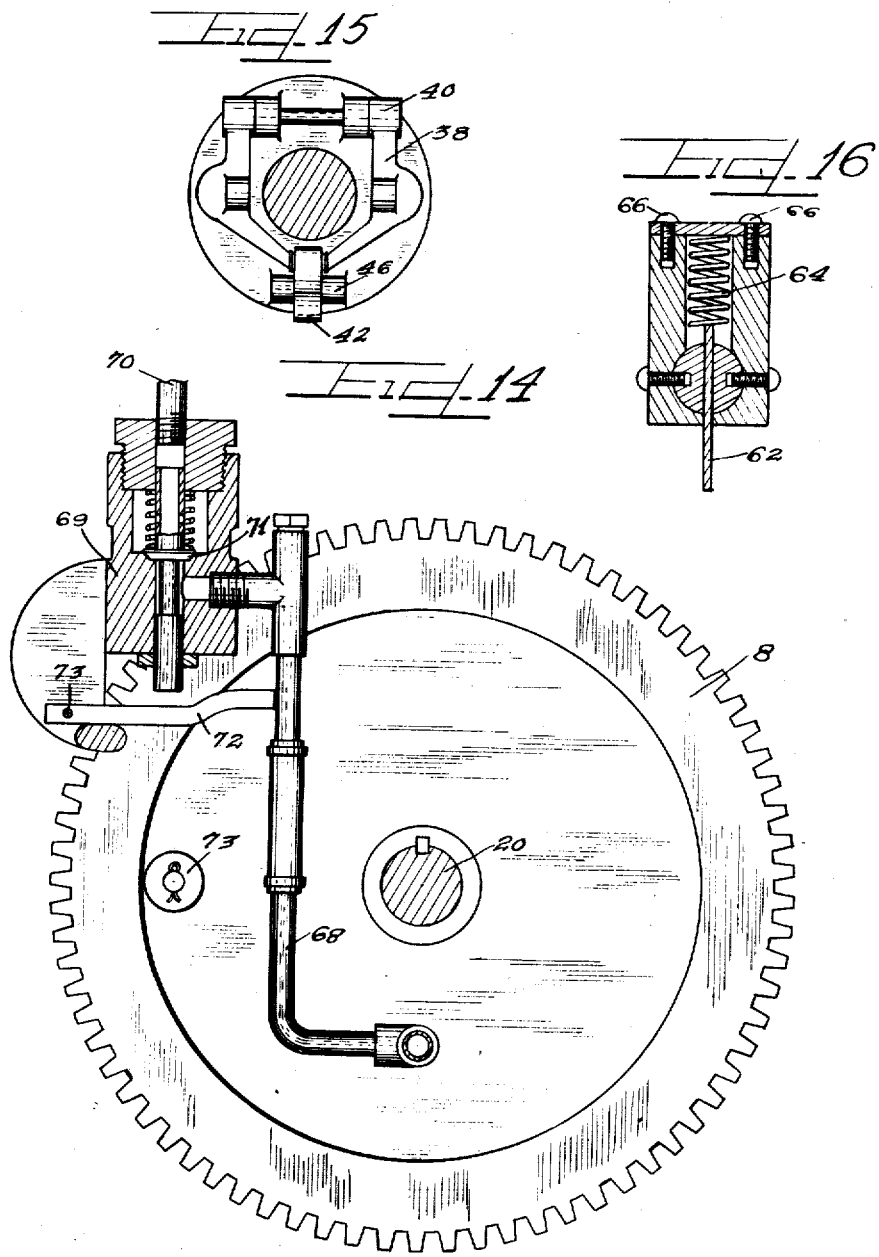

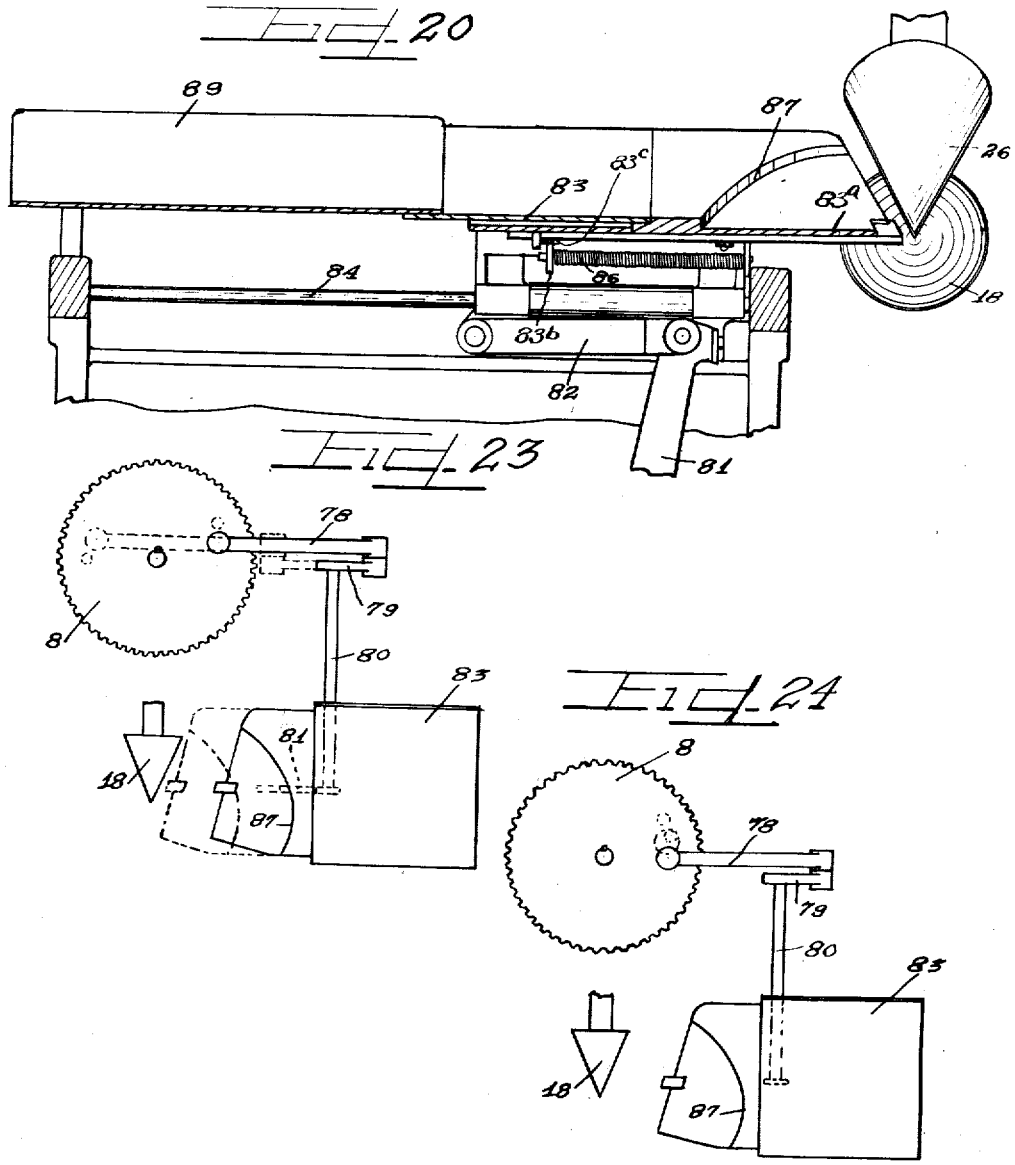

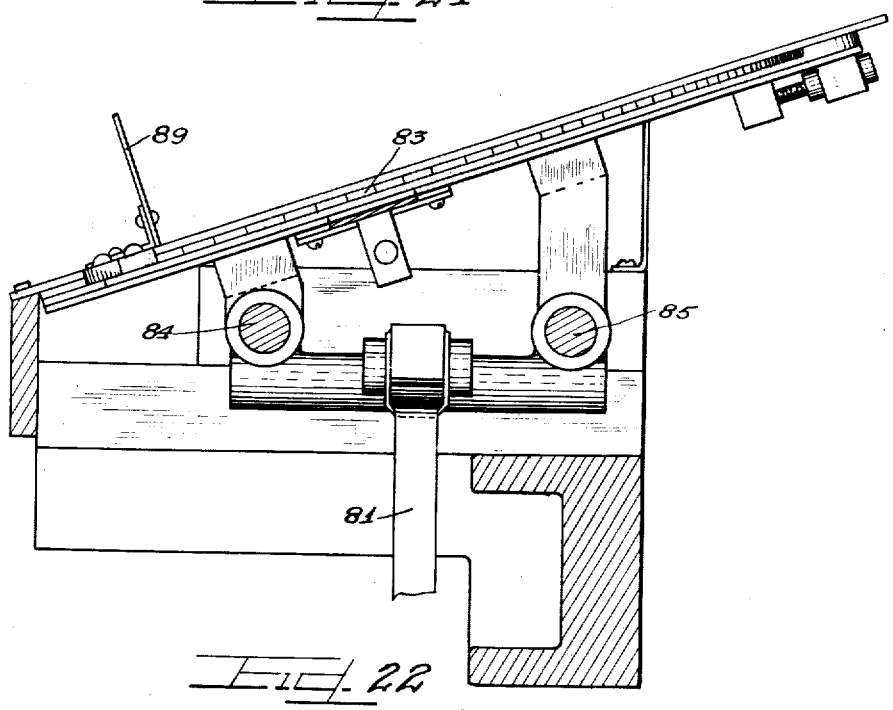
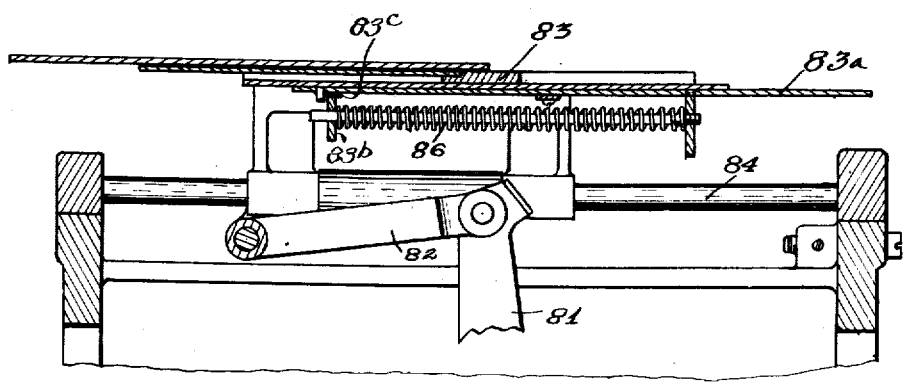

Patented May 20, 1924.

1,495,039

UNITED STATES PATENT OFFICE.

PETER T. POTTS, OF CHICAGO, ILLINOIS, ASSIGNOR TO THE VORTEX MANUFACTURING CO., A CORPORATION OF ILLINOIS.

SANITARY-CUP-MAKING MACHINE.

Application filed January 17, 1921, Serial No. 437,832. Renewed January 22, 1923.

*To all whom it may concern:*

Be it known that I, PETER T. POTTS, a citizen of the United States, and a resident of the city of Chicago, in the county of Cook and State of Illinois, have invented certain new and useful Improvements in a Sanitary-Cup-Making Machine; and I do hereby declare that the following is a full, clear, and exact description of the same, reference being had to the accompanying drawings, and to the numerals of reference marked thereon, which form a part of this specification.

This invention relates to paper cup formers and is directed to a machine for forming cups of a conical shape substantially as are shown and described in U. S. Letters Patent Nos. 1,188,048 and 1,260,520, both patented by David F. Curtin of Chicago, Illinois.

The chief object of this machine is the provision of means for feeding blanks of the proper shape into position between dies, forming them into cups and discharging them from the die or former when completed.

Another object of this invention is the provision of means whereby a fluid tight, complete and neat appearing cup is readily made from a prepared blank of paraffine covered paper.

Other and further important objects of this invention will be apparent from the disclosures in the drawings and annexed specification.

The invention (in a preferred form) is illustrated in the drawings and hereinafter more fully described.

In the drawings:

Figure 9 is a rear view of the head of the machine partly broken away showing the cone driving mechanism.

Figure 10 is a sectional view of the lower cone or die showing the air tube therein for ejecting the completed cups.

Figure 11 is a top view of the forming cone and its associated mechanism.

Figure 12 is a plan view of the main driving gear.

Figure 13 is a sectional view taken on the line 13—13 of Figure 12.

Figure 14 is a front view of the main driving gear showing its coaction with the cup ejecting mechanism.

Figure 15 is a section taken on the line 15—15 of Figure 5 looking in the direction indicated by the arrows.

Figure 16 is a sectional view showing the knife which scrapes any excess grease from the upper cone.

Figure 17 is a partial section taken on the line 17—17 of Figure 5.

Figure 18 is a view of the feed table taken from the under side thereof.

Figure 19 is a sectional view taken on the line 19—19 of Figure 18.

Figure 20 is a front view of the table showing its cooperation with the forming cones.

Figure 21 is an end view of the table.

Figure 22 is a sectional view of the table in a different position from that shown in Figure 20.

Figures 23 and 24 are diagrammatic views showing the connection between the driving gear and the feed table.

Figure 25 is a plan view of a blank from which the cup is made.

As shown on the drawings:

Figure 8:
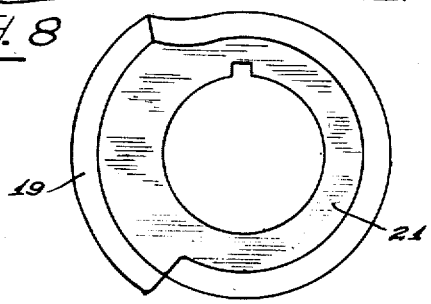
Figure 8 is a detail view of the cone separating cam.

The reference numeral 1 indicates the frame of the machine upon which the head 2 is supported. Mounted in suitable bearings in the head 2 is the main driving shaft 4 upon which are mounted fast and loose pulleys 5 and 6, adapted to be driven by a belt in an ordinary manner. A driving gear 7 is keyed to the shaft 4 and said gear cooperates with the main operating gear 8. Adjustably mounted upon the driving shaft 4 by means of a sleeve 10 and locking bolts 12 is another driving gear 14 in mesh with a smaller gear 15 which is mounted upon a driving shaft 16, which has fixed at its outer end the main cup forming cone 18. The gear wheel 8 is mounted upon a shaft 20 also held in bearings in the head 2 of the machine and which is parallel to the shafts 4 and 16 and immediately thereabove. Mounted upon the end of the shaft 20 is a cam 21 of the shape shown in Figure 8. The cam 21 is adapted to cooperate with a roller 22 mounted on a sleeve 23 pivoted to the machine head at 24. The member 23 is pivoted to the head 2 in suitable bearings at 24 and comprises a cylindrical bearing for a shaft 25 having fixed at its end a cooperative cup forming cone 26. Fixed upon the shaft 25 is a beveled gear 27 adapted to cooperate with a similar beveled gear 28 mounted on the shaft 16. The gears 27 and 28 are provided with extra long teeth which permit of their driving relation even when they are slightly separated to allow of the ejection of a cup from between the forming cones 18 and 26 which is accomplished by the action of cam 21 and roller 22. A yoke 30 is provided on the head 2 and has cooperating therewith a helical spring 32 mounted on a shaft 34 which is adapted to hold the forming cone 26 in contact with its companion cone 18 when in their normal position. A nut 33 is provided in order to adjust the tension of the spring 32.

Figure 7:
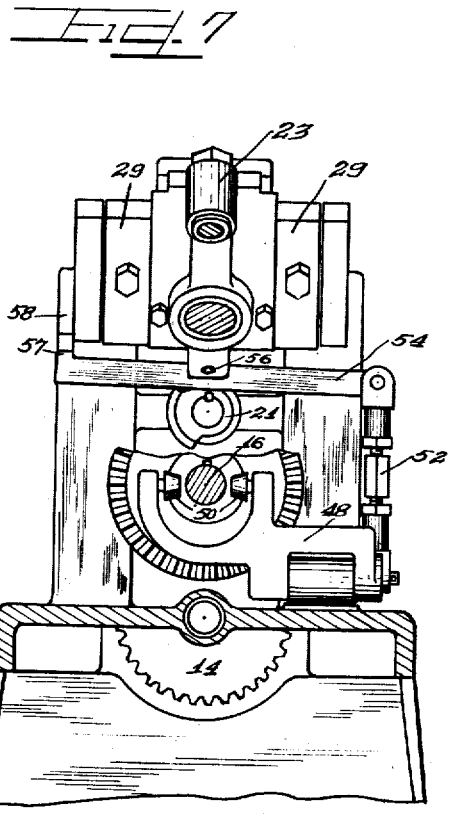
Figure 7 is a partial sectional view of the head of the machine, portions being broken away.

Slidably mounted upon the shaft 16 is a collar 36 adapted to cooperate with a yoke 38 pivoted at 40 to extensions 35 on the cup forming cone 18. The free end of this yoke is adapted to cooperate with a gripper finger 42 which is pivoted at 44 to an extension 46 on the cup forming cone. Mounted upon the end of a form of bell-crank lever 48 are two rollers 50 adapted to cooperate with the slidable collar 36. (See Figure 11). The bell-crank lever 48 is pivoted at 49 to the head 2 and has its free end connected to an adjustable lever 52 which in turn is connected at its end to a bar 54 which extends transversely across the machine and has its middle portion pivotally connected to the movable member 23 at 56. (See Figure 7). The further end of the bar 54 has a shoulder 57 which cooperates with a projection 58 on the head 2 of the machine.

Mounted upon the movable head 23 is a projecting member 60 having fixed thereon a scraping knife 62. This knife is held in position against the upper cup forming cone 26 by means of a helical spring 64 the tension of which can be variably adjusted by means of the screws 66. (See Figure 16).

Extending longitudinally through the shaft 16 and its cup forming cone 18 and terminating in one or more apertures 65 at the tip of the cup forming cone 18 is a passage 66ª adapted to allow air or other fluid medium to be pumped therethrough. The rear end of this passage is connected by a flexible connection or joint 67 to a tube 68 connected to a supply valve 69 leading from any convenient source of compressed air by a pipe 70. A spring held valve 71 is provided and has a longitudinally extending stem adapted to co-operate with a lifting member 72 pivoted at 72ª to the head of the machine. Mounted on the gear wheel 8 and adapted to cooperate with the valve lifting lever 72 is a roller 73 as shown in Figures 12 and 14. A gas pipe 75 leads into the machine and is provided with a jet 74 adapted to allow a flame to play upon the upper cone and also has an extension 76 provided with a similar jet to heat the underneath of the blank feeding table in order to melt the paraffine sufficiently to make the blanks adhere at their line of juncture when completed.

Pivotally mounted at 77 upon the gear 8 is a connecting rod 78, the other end of which is connected to a form of bell-crank lever 79 pivoted at 80 to the frame 1 of the machine. The other arm 81 of the bell crank lever is connected to a link 82 by means of which the movable parts of the blank feeding table 83 are reciprocated. The table 83 has two movable parts, the upper portion having a depression 87 therein corresponding to the shape of a blank and this portion is slidably mounted upon longitudinally extending rods 84 and 85 and has slidably positioned thereunder a member 83ª, which supports the extending tip 110ª of a blank 110 while the table is moving forward into blank feeding position. The slidable member 83ª is, however, arrested in its forward movement before it contacts with the dies, while the main portion 83 of the table continues to move forward thereby insuring a positive feed of the blank to the dies. The reciprocating motion of the table 82 is best shown diagrammatically by Figures 23 and 24. The member 83ª is normally held extended in blank supporting position by means of the coiled spring 86 and is pushed inwardly under the main portion 83 of the table when the downwardly extending projection 83ᵇ contacts with the lug 83ᶜ as best shown in Figure 20. The fixed portion of the table 83 is provided with an upwardly extending bracket 89 adapted to hold a number of blanks 110 in position ready to be fed by the operator into the depression 87 from whence they are transferred to the conical forming dies.

A chute 90 leads to a receptacle 91 provided for the finished cups and which has a movable cup supporting member 92 in the form of an arm extending laterally therefrom and slidably mounted upon a vertically extending rod 93. The cup supporting member 92 is held in position by means of a rope or cable 94 which extends over a pulley mounted on a shaft upon which is fixed a ratchet wheel 95, the other end of the rope 94 being attached to a weight adapted to slide in a vertical cylinder 96. A pawl 97 is mounted upon a reciprocating arm 98, which is connected to the table moving mechanism in such a manner that at each reciprocation of the table the pawl 97 feeds the ratchet wheel 95 a distance sufficient to allow the movable cup supporting member 92 in the cylinder 91 to be depressed sufficiently to allow of the insertion of another completed cup into the receiving cylinder 91. A retaining pawl 100 is provided which is spring pressed into engagement with the teeth of the ratchet wheel 95 and retains the supporting member 92 in position against the pull of the weight in the cylinder 96. A stop 99 is provided at the further side of the forming dies to prevent any blanks from being fed completely through the dies and thrown out of same on account of the high speed at which they are operated.

The pawl operating lever 98 is in turn reciprocated by means of a transversely extending lever 101, connected to the table 83 by means of a link 102 provided with bifurcated ends 103 pivoted to the under side of the table at 104. A stop 106 is provided for limiting the forward movement of the table 83 which is resiliently drawn into this forward position by a coiled spring 105 on the bell-crank lever 79—81 and the extreme feeding position of the table is made adjustable by means of the set screw 107 which cooperates with the stop 106.

Figure 1:
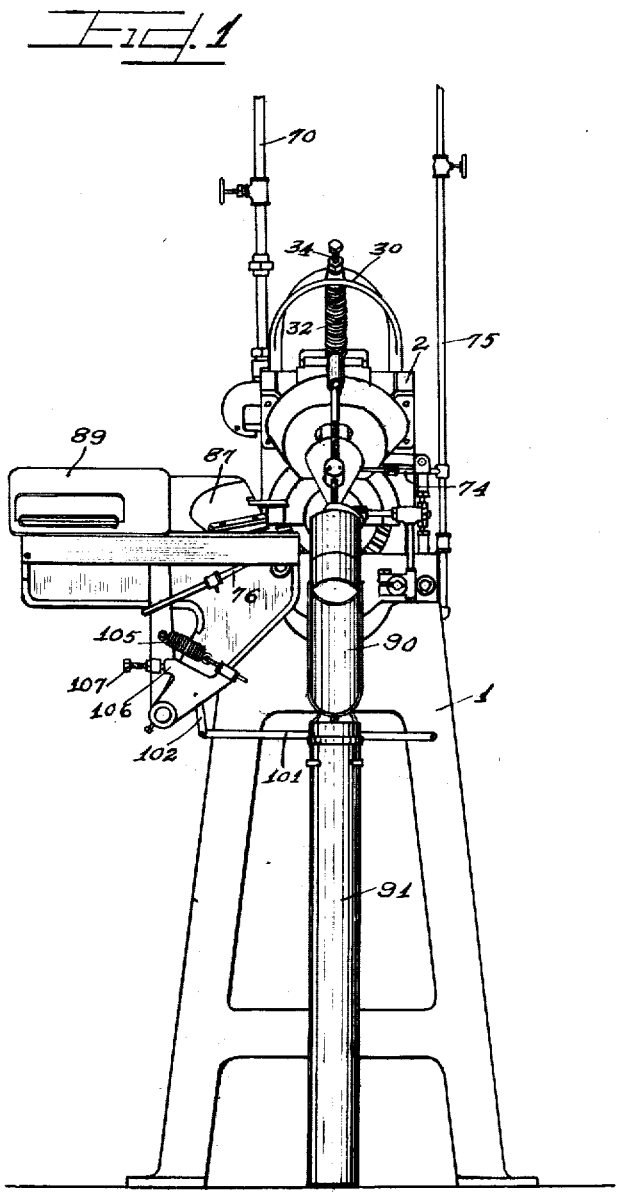
Figure 1 is a front view of the improved machine.
Figure 2:
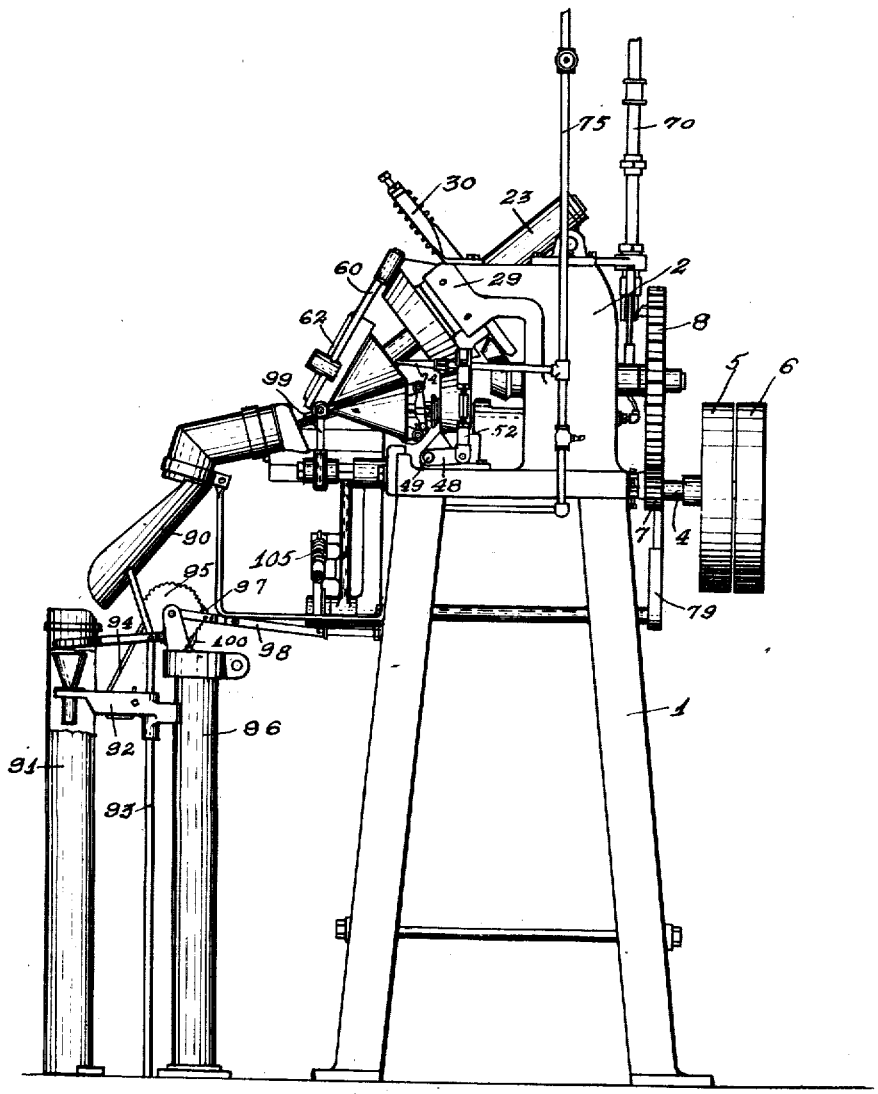
Figure 2 is a side view of the same.
Figure 3:
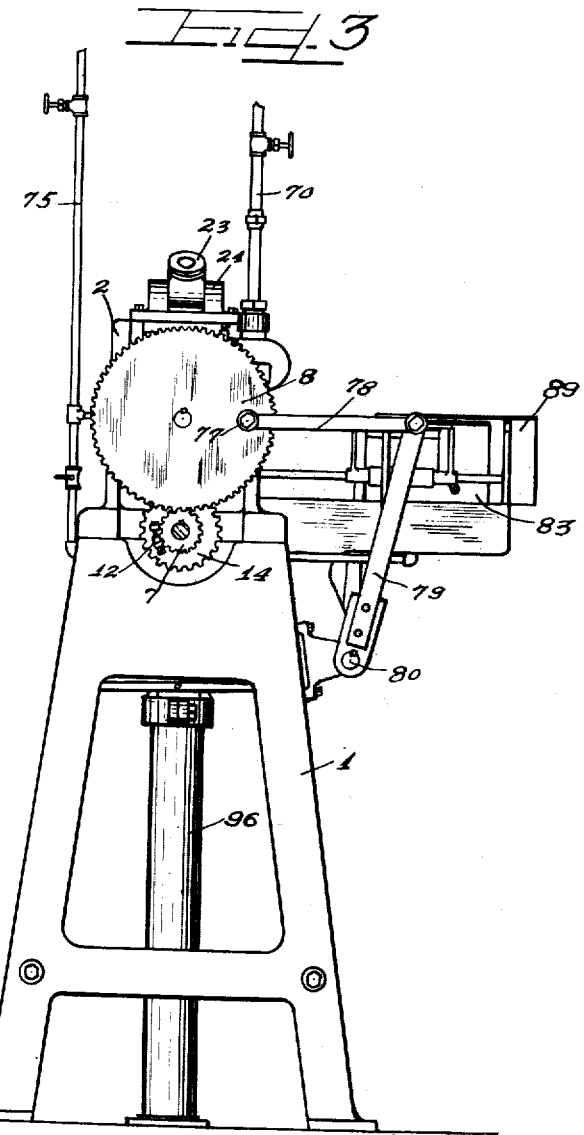
Figure 3 is a rear view.
Figure 4:
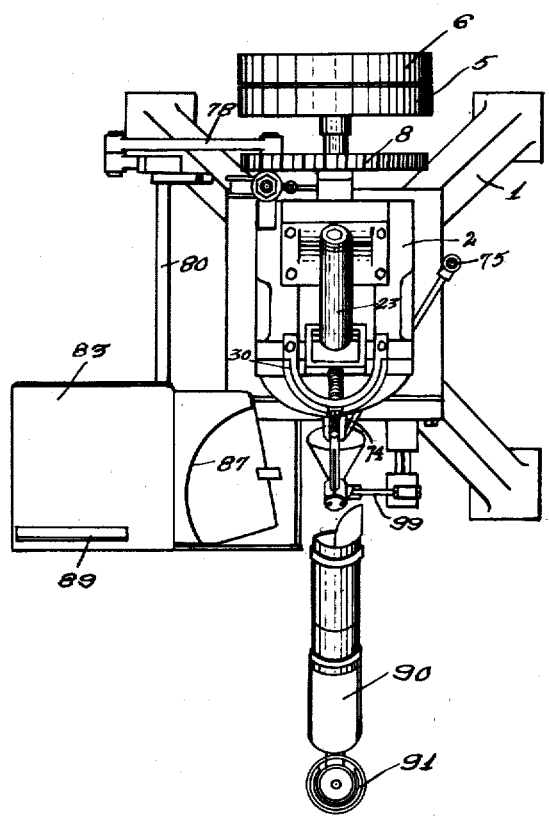
Figure 4 is a top plan view.
Figure 5:
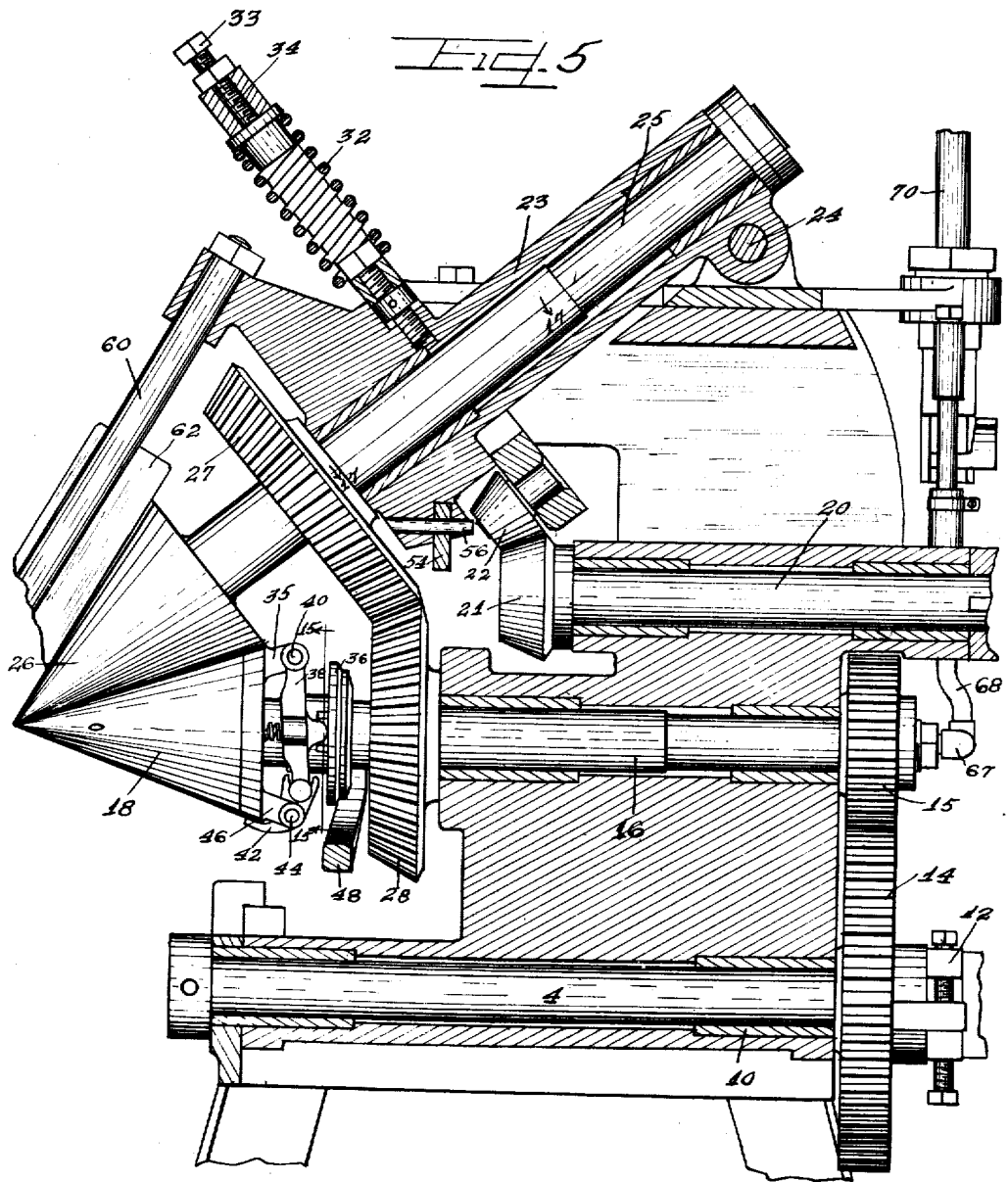
Figure 5 is an enlarged detail sectional view, the head of the machine showing the conical formers or dies in one position.
Figure 6:
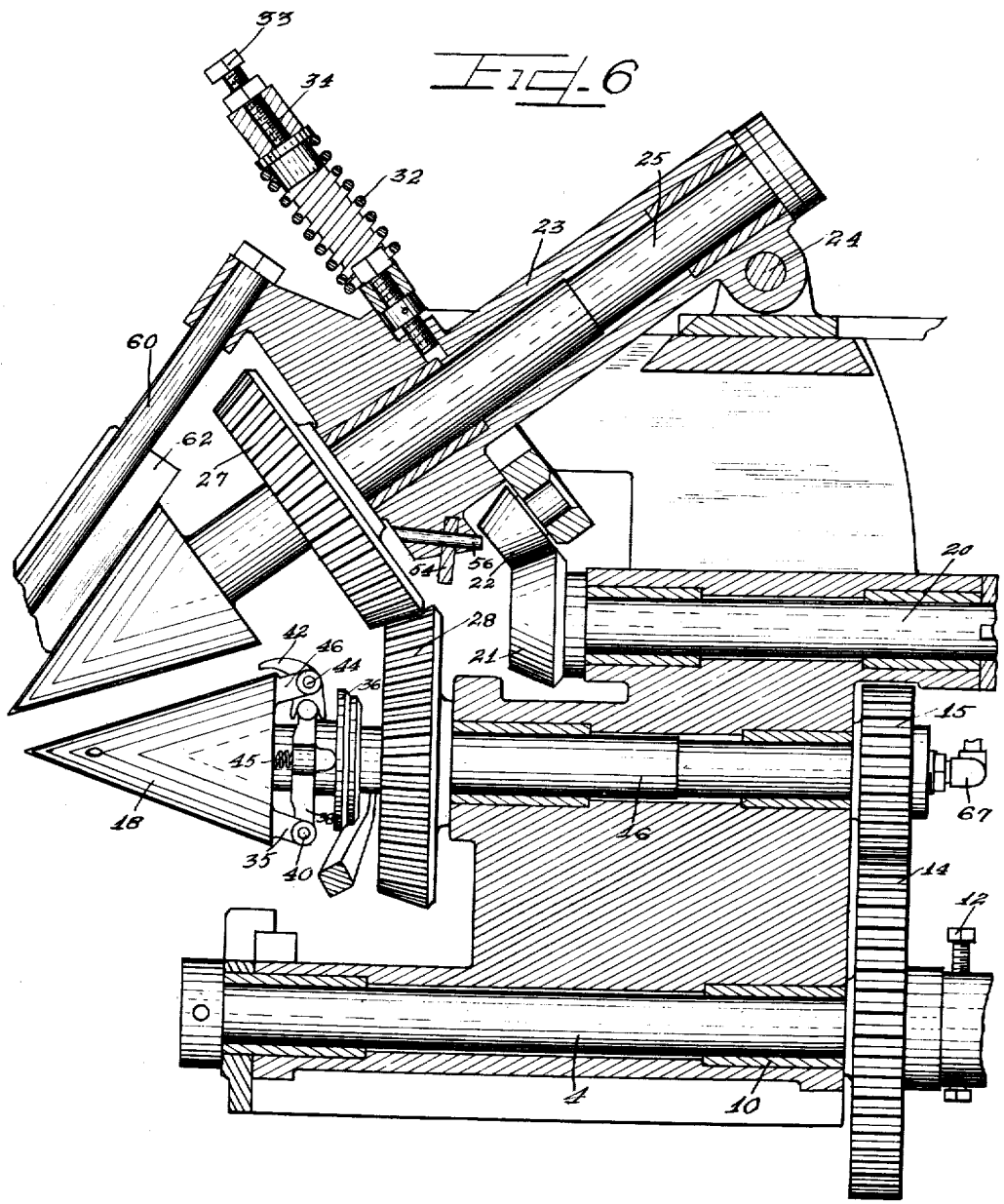
Figure 6 is a similar view showing the dies in another position.

The operation is as follows:

A belt driven from any convenient source of power is shifted into position upon the driving pulley 5 on the shaft 4 by means of an ordinary clutch, whereupon the gear 7 in contact with the gear 8 rotates the same. The gear 14 upon the shaft 4 is thereby also rotated and drives the gear 15 which in turn imparts motion to the shaft 16 and the cup forming cone 18 thereon, the ratio between gears 15 and 8 being 6:1. A similar and equal revolution is imparted to the forming cone 26 by means of the gears 27 and 28 mounted upon the shafts 16 and 25 respectively. The gears 27 and 28 have teeth of such a length that they are always in mesh even when the cones are separated as shown in Figure 6. The high portion of the cam 21 upon which the roller 22 operates is so designed that the cones are separated for two and one quarter revolutions, and then come in contact for three and three quarter revolutions, which six revolutions completes the forming of a cup. The cup forming cones 18 and 26 are normally held in contact with each other by means of the helical spring 32 and are adapted to be separated because the shaft 25 upon which the upper forming cone 26 is mounted rotates in the sleeve bearing 23 which is pivoted at 24.

While the cones are turning a reciprocating motion is given to the table 83 by means of the crank 78 mounted upon the gear 8 and the bell-crank lever 79—81. A blank of a suitable size and shape having been inserted into the depression 87 in the table 83 the whole is then fed forward and the blank is taken into the cones and held in position on the bottom cone by means of the gripper finger 42, said bottom cone or die being that upon which the cup is formed. A depression is made in the periphery of the upper cone 26 in order to allow free action of the gripper finger 42. After the blank has been taken from the table 83 and is held in position upon the cup forming cone 18 by means of the gripper finger 42 the cones are given three and three quarters revolutions while in contact with each other the upper cone being sufficiently heated by means of the gas jet 73 to melt the paraffine upon the edges of the blank to make the same adhere and thereby form a cup which is sealed and non-leakable. After three and three quarter revolutions the raised portion of the cam 21 comes into contact with the roller 22 which acts to separate the cones. As the cones are being separated the roller 73 comes into contact with the lever 72 and operates the valve 71 in the air pressure pipe line and allows sufficient air to enter the passage 66 in the shaft 16 to blow the completed cup from the cone and into the delivery chute 90 from whence it is carried by gravity to the container 91. The cones or forming dies then continue to rotate through two and a quarter more revolutions while separated during which time the table 83 is moving backward and is receiving another blank into the depression 87 which blank is properly positioned by the operator of the machine. A forward motion of the table again takes place and at the completion of the sixth revolution the table is again in position to deliver another blank to the cup forming cones which are then again coming into contact, the high portion of the cam 21 having been passed. The scraping blade 62 is provided upon the upper cone in order to remove any excess paraffine therefrom, which would materially interfere with the production of uniform cups if allowed to accumulate upon the roller 26. The operation of the gripping finger 42 is so timed as to hold the cup in position upon the lower cup forming cone while the cones are in contact with each other and to immediately release the cup when the cones are being lifted apart and when the air pressure is being applied. This is accomplished by means of the sliding collar 36 which cooperates with the pivoted yoke 38 which operates the gripper finger. The two rollers 50 which operate in conjunction with the sliding collar 36 to control the movement of the same and the gripper finger 42 are mounted upon one arm of the bell-crank 48, the other arm of which is connected by the adjustable link 52 to the transversely extending lever 54 which is pivoted at 56 to the movable bearing or sleeve 23 in such a manner that when the sleeve 23 is lifted up by means of the raised portion of the cam 21 the link 52 is pulled upward by reason of the bar 54 having a fulcrum at 57 and this acting through the bell crank 48 pushes the rollers 50 and the collar 36 forward thus releasing the gripper finger 42 and allowing the cup to be ejected from the cup forming cone 18 by means of the air pressure. The adjustability of the gear 14 upon the shaft 4 by means of the bolt 12 is taken advantage of to move up the gear 15 and the corresponding parts on the cone forming member in order to adjust the time of contact of the gripper finger 42 with the blank and also the time of ejection of the cup by means of the air valve. Adjustment of the gear 14 on the shaft 4 furthermore serves to effect the operation of the gear 8 to cause adjustment of the time at which the cam 21 will act on the roller to separate the forming dies or cones. The stop 99 is provided in order to prevent the cup blanks from being drawn completely through the cup forming cones 18 and 26 on account of the speed of rotation thereof.

After the cup has been formed and thrown off the cone 18 it drops through the chute 90 into the container 91 and if it were allowed to fall to the bottom of the container 91 the completed cups would pile up in the same in rather irregular order and they would need rearrangement when stacked and therefore this means is provided for keeping the cups always in contact with each other and in a uniform stack by having the support 92 moved downwardly a certain predetermined distance each time a cup is ejected from the machine.

I am aware that numerous details may be varied through a wide range without departing from the principles of this invention, and I therefore do not purpose limiting the patent granted hereon otherwise than necessitated by the prior art.

I claim as my invention:

1. In a machine for forming cups from suitably formed blanks, a pair of rollers comprising a forming roller and a pivotally mounted heated pressing roller adapted to engage a blank between them, means cooperating with the surface of said pressing roller to prevent the accumulation of material upon said roller, and mechanism for continuously rotating the rollers, in combination with means for swinging the presser roller about its pivot for releasing the cups when the forming operation is completed.

2. A paper cup former comprising a supporting frame, a head mounted upon said frame, a shaft journalled in the head and provided at one end with a conical cup former, a sleeve pivoted upon the head, a shaft journalled in said sleeve and provided with a similar conical cup former having its peripheral surface contacting with that of the first named cone and directly above the same, the upper cone being movable away from the lower cone, means tending to hold the upper cone toward the lower cone, a shaft journalled in the head of the machine parallel to said first named shaft and driven by gears connecting said shafts, a cam mounted on said shaft adapted to engage a roller upon the pivoted sleeve, said cam having a high portion which operates to move said cup forming cones apart, a continuous driving connection between the upper cone and the lower cone, an axial passage in the lower cone for fluid under pressure, having an opening at the apex of the same, means for supplying a fluid under pressure to said passage, a valve for controlling the supply, means connected to the lower cone for gripping a blank at predetermined intervals, and means operating to simultaneously open the valve to admit air, release the completed blanks and separate the cup forming cones.

3. A paper cup former comprising in combination a pair of dies adapted to cooperate to form a cup, one of said dies being pivoted and relatively movable, and means for alternately separating and contacting said dies, said means being so arranged that the dies are held in contact during three and three quarters revolutions and held separated during two and one quarter revolutions.

4. In a paper cup forming machine the combination of a main driving shaft, two cup forming shafts and an actuating shaft driven by the main shaft, the speed ratio between the cup forming shafts and the actuating shaft being 6:1, a conical cup former upon one of the said cup forming shafts, a lifting cam upon the slow shaft, and an auxiliary forming cone cooperating with the main cone and driven therefrom, said auxiliary cone being pivoted and adapted to be lifted away from the main cone by means of the cam.

5. In a cup forming machine the combination of cup forming means, blank feeding means, cup ejecting means and means for receiving the formed cups, said last named means comprising a cylinder having a movable supporting member therein.

6. In a paper cup forming machine the combination of cup forming means, blank feeding means, cup ejecting means and means for receiving the formed cups, said last named means comprising a cylinder having a movable supporting member therein, said supporting member being adapted to be progressively downwardly actuated upon the receipt of successively formed cups.

7. In a paper cup forming machine the combination of means for forming cups from suitably formed blanks, a feeding table for feeding a blank into the forming means at predetermined intervals, ejecting means for ejecting a formed cup from the forming means upon completion of the cup, and a receptacle for holding the completed cups, said receptacle being provided with a movable supporting member, said member being progressively downwardly actuated upon the receipt of succeeding cups, this downward actuation being accomplished by means of a pawl and ratchet mechanism operated by a lever attached to the reciprocating blank feeding means.

8. In a machine for forming receptacles from prepared blanks, the combination of feeding means and forming means for the blanks, together with means co-acting with both of said first named means to render the prepared blanks adhesive.

9. In a machine for forming cups from prepared blanks, the combination of feeding means and forming means for the blanks, together with means co-acting with both of said first named means to render the edges of the prepared blanks adhesive to adhere to each other and form a waterproof cup, automatic mechanisms for ejecting the formed cups, and adjustable means for receiving the ejected cups.

10. In a machine for forming receptacles, the combination of blank feeding means, continuously rotating forming means, and discharging means all operated by a master gear.

11. In a machine for forming receptacles, the combination of blank feeding means, conical forming members, discharging means in one of said members, and automatic stacking means all operated by a master gear.

12. In a cup forming machine the combination with cup forming means, means for heating the same to render cup blanks adhesive, cup blank feeding means for delivering cup blanks to said forming means, and means for heating said feeding means to also render the cup blanks adhesive.

13. In a machine for forming receptacles, a pair of co-acting forming dies, means for separating the dies at intervals, a reciprocating table for feeding a blank between said dies when separated, means for heating said table to render the blank adhesive to permit the same to be formed into a receptacle by said dies, a gear, a crank pivotally connected to be operated by said gear, and a bell crank connected with said table and with said crank to operate said table.

14. In a cup forming machine the combination with a forming die, of a pivoted support, a presser die thereon, means for feeding a blank between the forming die and the presser die, a gripper mechanism mounted on said forming die adapted to grip a cup blank on said forming die, a slidable collar, a pivoted bell-crank lever, rollers thereon adapted to co-operate with the slidable collar to cause actuation of said gripper mechanism, a bar pivoted on said pivoted support, and an adjustable lever connecting said bar with said bell-crank lever.

15. In a machine for forming receptacles from blanks, forming means, a fixed table, a reciprocating slide on said table for feeding blanks to the forming means, and means for heating the reciprocating slide to render the blanks adhesive.

16. In a machine for forming receptacles from blanks, a pair of forming dies, and blank feeding elements relatively slidable with respect to one another, and means for heating one of said blank feeding elements for rendering the blanks adhesive while feeding the same to said forming dies.

In testimony whereof I have hereunto subscribed my name in the presence of two subscribing witnesses.

PETER T. POTTS.

Witnesses:
FRANK C. SMITH,
HORACE A. GRIGNON.

DISCLAIMER 1,495,039.—*Peter T. Potts*, Chicago, Ill. SANITARY-CUP-MAKING MACHINE. Patent dated May 20, 1924. Disclaimer filed February 16, 1938, by the assignee, *Dixie-Vortex Company*.

Hereby enters this disclaimer to claim 10 in said Letters Patent.
[*Official Gazette March 22, 1938.*]